US008869895B2

(12) United States Patent
Sarap et al.

(10) Patent No.: US 8,869,895 B2
(45) Date of Patent: Oct. 28, 2014

(54) BIODEGRADABLE SET RETARDER FOR A CEMENT COMPOSITION

(75) Inventors: Girish Dinkar Sarap, Pune (IN); Sandip Prabhakar Patil, Pune (IN); Dibyadarshani Senapati, Pune (IN); Abhijit Tarafdar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

(21) Appl. No.: 12/633,507

(22) Filed: Dec. 8, 2009

(65) Prior Publication Data

US 2011/0132605 A1 Jun. 9, 2011

(51) Int. Cl.
*E21B 33/13* (2006.01)
*C09K 8/00* (2006.01)
*C04B 14/00* (2006.01)

(52) U.S. Cl.
USPC ............................ 166/293; 106/724; 523/130

(58) Field of Classification Search
None
See application file for complete search history.

(56) References Cited

U.S. PATENT DOCUMENTS

| | | | |
|---|---|---|---|
| 2,650,905 A | 9/1953 | Fordyce | |
| 2,718,497 A | 9/1955 | Oldham | |
| 3,776,850 A | 12/1973 | Pearson et al. | |
| 3,943,083 A | 3/1976 | Adams | |
| 4,500,357 A | 2/1985 | Brothers | |
| 4,654,159 A | 3/1987 | Bush et al. | |
| 4,846,650 A | 7/1989 | Benedict et al. | |
| 4,941,536 A | 7/1990 | Brothers | |
| 4,960,465 A | 10/1990 | Arfaei | |
| 5,221,489 A | 6/1993 | Bloys | |
| 5,264,470 A | 11/1993 | Eoff | |
| 5,866,517 A | 2/1999 | Carpenter | |
| 5,874,387 A | 2/1999 | Carpenter | |
| 5,989,336 A | 11/1999 | Carpenter | |
| 6,165,262 A | 12/2000 | Kono et al. | |
| 7,004,256 B1 | 2/2006 | Chatterji | |
| 2008/0020961 A1* | 1/2008 | Rodrigues et al. | 510/475 |
| 2009/0038800 A1 | 2/2009 | Ravi | |
| 2010/0160488 A1* | 6/2010 | Assmann et al. | 523/130 |

FOREIGN PATENT DOCUMENTS

| | | |
|---|---|---|
| EP | 1881016 | 1/2008 |
| GB | 2114985 | 1/1983 |
| GB | 2404378 | 2/2008 |
| GB | 2443923 | 5/2008 |

OTHER PUBLICATIONS

PCT International Search Report, PCT/GB2010/002246, issued Dec. 8, 2010.
R.J. Larson, Biodegradation of Acrylic Acid Polymers and Oligomers by Mixed Microbial Communities in Activated Sludge, Journal of Environmental Polymer Degradation, vol. 5, No.
Human & Environmental Risk Assessment on ingredients of European household cleaning products, Sep. 2007, http://www.heraproject.com/files/32-F-HERA_polycarboxylates_final.
R.J. Larson, E.A. Bookland, R. T. Williams, K.M. Yocom, D.A. Saucy, M.B. Freeman, and G. Swift, Biodegradation of Acrylic Acid Polymers and Oligomers by Mixed Microbial Communities in Activated Sludge, Journal of Environmental Polymer Degradation, vol. 5, No. 1, 1997.

* cited by examiner

*Primary Examiner* — Angela M DiTrani
(74) *Attorney, Agent, or Firm* — Craig Roddy; Booth Albanesi Schroeder, LLC

(57) ABSTRACT

Compositions and methods are directed to a cement composition for use in a subterranean formation. In an embodiment the cement composition comprises: (A) cement; (B) water; and (C) a polymer, wherein the polymer: (i) consists essentially of a monomer or monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing; (ii) has the following characteristics: (a) is water soluble; and (b) is biodegradable; and (iii) is capable of providing: (a) a thickening time of at least 2 hours for a test composition maintained under a temperature condition of 190° F. and a pressure of 5,160 psi; and (b) an initial setting time of less than 24 hours for the test composition maintained under a temperature condition of 217° F. and a pressure of 3,000 psi, wherein the test composition consists of 860 grams of Class-H Portland cement, 325 grams of deionized water, and 0.4% by weight of the cement of the polymer. In another embodiment the method comprises the steps of: (A) introducing the cement composition into the subterranean formation; and (B) allowing the cement composition to set after introduction into the subterranean formation.

20 Claims, 7 Drawing Sheets

BIODEGRADABLE SET RETARDER FOR A CEMENT COMPOSITION

FIELD OF THE INVENTION

The invention is directed to a cement composition for use in a subterranean formation and a method for cementing a subterranean formation. In certain embodiments, the subterranean formation contains an oil or gas well.

SUMMARY OF THE INVENTION

According to an embodiment, a cement composition comprises: (A) cement; (B) water; and (C) a polymer, wherein the polymer: (i) consists essentially of a monomer or monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing; (ii) has the following characteristics: (a) is water soluble; and (b) is biodegradable; and (iii) is capable of providing: (a) a thickening time of at least 2 hours for a test composition maintained under a temperature condition of 190° F. and a pressure of 5,160 psi; and (b) an initial setting time of less than 24 hours for the test composition maintained under a temperature condition of 217° F. and a pressure of 3,000 psi, wherein the test composition consists of 860 grams of Class-H Portland cement, 325 grams of deionized water, and 0.4% by weight of the cement of the polymer.

According to another embodiment, a method for cementing in a subterranean formation comprises the steps of: (A) introducing the cement composition into the subterranean formation; and (B) allowing the cement composition to set after introduction into the subterranean formation.

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, the polymer consists essentially of a monomer or monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing. The polymer can contain other monomers so long as the presence of the other monomers does not materially affect the basic and novel characteristics of the claimed invention, i.e., so long as the polymer is water soluble and is biodegradable.

The polymer as explained above consisting essentially of a monomer or the monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing can be grafted onto a biodegradable backbone such as gelatin, lignin, tannin, chitosan and cellulose. Preferably the polymer can be grafted onto a gelatin backbone.

It should also be understood that, as used herein, "first," "second," and "third," are assigned arbitrarily and are merely intended to differentiate between two or more monomers, fluids, etc., as the case may be, and does not indicate any sequence. Furthermore, it is to be understood that the mere use of the term "first" does not require that there be any "second," and the mere use of the word "second" does not require that there be any "third," etc.

BRIEF DESCRIPTION OF THE DRAWING

The features and advantages of the inventions will be more readily appreciated when considered in conjunction with the accompanying drawing. The accompanying drawing is incorporated into the specification to help illustrate examples of certain embodiments. The drawing is not to be construed as limiting the invention.

The experiments for the data contained in the drawing were performed on a cement composition, having a density of 16.4 pounds per gallon (ppg), containing: 5.48 gallons of deionized water; Class-H cement; SSA-2™ strength stabilizer at a concentration of 35% by weight of the cement (bwc); HALAD®344 fluid loss additive at a concentration of 0.5% bwc; and a polymer according to the invention. In certain experiments, the polymer was PAA/MA (a sodium salt copolymer of acrylic acid and maleic anhydride) having an average molecular weight of 4,500 and a mole ratio of 80:20). In certain experiments, the polymer was PAA (a homopolymer of acrylic acid). The drawing includes the following figures.

DETAILED DESCRIPTION OF THE INVENTION

Figure 1:
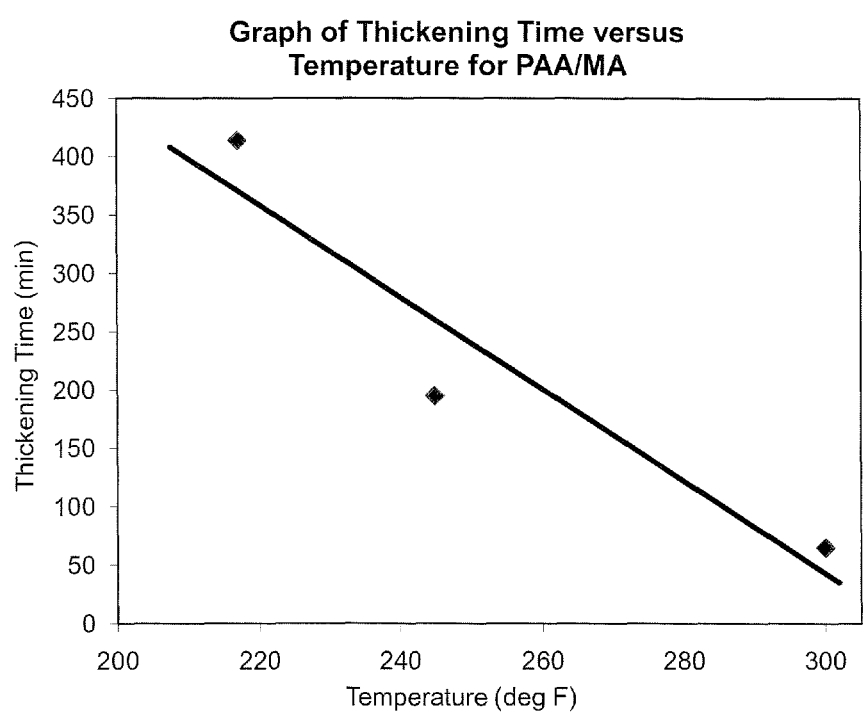
FIG. 1 is a graph of thickening time in minutes (min) versus temperature in Fahrenheit (° F.) for the cement composition at a pressure of 10,200 psi wherein the polymer was PAA/MA at a concentration of 0.4% bwc.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a well is drilled into a subterranean formation.

According to certain embodiments, the subterranean formation contains an oil or gas well. As used herein, a "well" includes at least one wellbore drilled into a subterranean formation, which may be a reservoir or adjacent to a reservoir. A wellbore can have vertical and horizontal portions, and it can be straight, curved, or branched. As used herein, the term "wellbore" refers to a wellbore itself, including any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

As used herein, a "fluid" is a substance having a continuous phase and that tends to flow and to conform to the outline of its container when the substance is tested at a temperature of 71° F. and a pressure of one atmosphere. An example of a fluid is a liquid or gas. As used herein, a "fluid" can have more than one distinct phase. For example, a "fluid" can be or include a slurry, which is a suspension of solid particles in a continuous liquid phase; it can be or include an emulsion, which is a suspension of two or more immiscible liquids where droplets of at least one liquid phase are dispersed in a continuous liquid phase of another; or it can be or include a foam, which is a suspension or dispersion of gas bubbles in a continuous liquid phase.

In order to produce oil or gas, a wellbore is drilled into or near a subterranean formation. The wellbore may be an open hole or cased hole. In an open-hole wellbore, a tubing string is placed into the wellbore. The tubing string allows fluids to be introduced into or flowed from a remote portion of the wellbore. In a cased hole, a casing is placed into the wellbore that can contain a tubing string. In an open hole, the space between the wellbore and the outside of a tubing string is an annulus. In a cased hole, the space between the wellbore and the outside of the casing is an annulus. Also, in a cased hole, there may be an annulus between the tubing string and the inside of the casing.

As used herein, a "cement composition" is a mixture of at least cement and water, and the cement composition can include additives. As used herein, the term "cement" means a dry powder substance that acts as a binder to bind other materials together. During well completion, it is common to introduce a cement composition into an annulus in the wellbore. For example, in a cased hole, the cement composition is placed and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in well-plugging operations or gravel-packing operations.

During cementing operations, it is necessary for the cement composition to remain pumpable during introduction into the well and until the composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

As used herein, the "thickening time" is how long it takes for a cement composition to become unpumpable under specified temperature and pressure conditions. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). The cement composition is then placed in the test cell of a High-Temperature, High-Pressure (HTHP) consistometer, such as a Fann Model 275 or a Chandler Model 8240. The cement composition is ramped up to the specified temperature and pressure condition and is maintained under the temperature and pressure condition. Consistency measurements are taken continuously until the cement exceeds 70 Bc.

A cement composition can develop compressive strength. Cement composition compressive strengths can vary from 0 psi to over 10,000 psi. As used herein, "compressive strength" is measured at a specified time after the composition has been mixed and the composition is maintained under specified temperature and possibly pressure conditions. For example, compressive strength can be measured at a time in the range of about 24 to about 48 hours after the composition is mixed and the composition is maintained at a temperature of 217° F. Compressive strength can be measured by either a destructive method or non-destructive method.

The destructive method physically tests the strength of cement composition samples at various points in time by crushing the samples in a compression-testing machine. The compressive strength is calculated from the failure load divided by the cross-sectional area resisting the load and is reported in units of pound-force per square inch (psi) or megapascals (MPa).

The non-destructive method continually measures estimated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). The cement composition is placed in an Ultrasonic Cement Analyzer and heated to the specified temperature condition and pressurized to the specified pressure condition. The UCA continually measures the transit time of the acoustic signal through the sample. The UCA device contains preset algorithms that correlate transit time to compressive strength. The UCA reports the compressive strength of the cement composition in psi.

The compressive strength of a cement composition can be used to indicate whether the cement composition has set. A cement composition "initially sets." As used herein, a cement composition is considered "initially set" when the cement composition develops a compressive strength of 50 psi using the non-destructive compressive strength method at a temperature condition of 217° F. and a pressure of 3,000 psi. As used herein, the "initial setting time" is the difference in time between when the cement is added to the water and when the composition is initially set.

As used herein, the term "set" is intended to mean the process of becoming hard or solid by curing. It may take up to 72 hours for a cement composition to set. Some cement compositions can continue to develop a compressive strength greater than 50 psi over the course of several days. The compressive strength of a cement composition can reach over 10,000 psi.

A set retarder can be added to a cement composition to help increase the thickening time of the cement composition such that the cement composition remains pumpable for a desired time. The thickening time is proportional to the setting time, i.e., the longer the thickening time, the longer the setting time will be. Therefore, a set retarder can be added to a cement composition to help increase the setting time of the cement composition. However, if a set retarder is in too-high a concentration, the cement composition may never set. Therefore, the set retarder also can be used in a concentration such that the cement composition sets in a desired time.

Conventional set retarders have been used to delay the setting time of cement compositions. Examples of conventional set retarders are disclosed in U.S. Pat. No. 7,004,256 issued Feb. 28, 2006 to Chatterji et al., which is incorporated by reference in its entirety. Another example of a conventional set retarder is a copolymer formed from a monomer of 2-acrylamido-2-methylpropane sulfonic acid ("AMPS"). One example of a conventional AMPS set retarder is "SCR-100™", available from Halliburton Energy Services, Inc. in Duncan, Okla.

A polymer is a large molecule composed of repeating units typically connected by covalent chemical bonds. The number of repeating units of a polymer can range from approximately 10 to greater than 10,000. The number of repeating units of a polymer is referred to as the chain length of the polymer. A polymer is formed from the polymerization reaction of monomers. A polymer formed from one type of monomer is called a homopolymer. A copolymer is formed from two or more different types of monomers. In the polymerization reaction, the monomers are transformed into the repeating units of a polymer. The conditions of the polymerization reaction can be adjusted to help control the average number of repeating units (the average chain length) of a polymer. A polymer also has an average molecular weight, which is directly related to the average chain length of the polymer. The average molecular weight of a polymer has an impact on some of the physical characteristics of a polymer, for example, its solubility in water and its biodegradability.

For a copolymer, each of the monomers will be repeated a certain number of times (number of repeating units). The average molecular weight for a copolymer can be expressed as follows:

$$\text{Avg. molecular weight} = *(M.W.m_1 * RUm_1) + (M.W.m_2 * RUm_2)$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

For a copolymer made from two monomers, the mole ratio is the ratio of the moles of the first monomer to the moles of the second monomer. For example, a copolymer can have a mole ratio of 50:50, which means that, for every one mole of the first monomer, there is one mole of the second monomer. By way of another example, a mole ratio of 80:20 means that, for every 4 moles of the first monomer, there is one mole of the second monomer.

In a copolymer, the repeating units for each of the monomers can be arranged in various ways along the polymer chain. For example, the repeating units can be random, alternating, periodic, or block.

Some polymer conventional set retarders do not increase the thickening at least 2 hours in high-temperature wells. As used herein, a high-temperature well is a well with a bottom-hole temperature in the range of 150° F. to 500° F. The bottomhole temperature refers to the downhole temperature at the portion of the well to be cemented. In order to make some polymer conventional set retarders effective in high-temperature wells, the molecular weight of the polymer can be increased (usually to a molecular weight of greater than 10,000).

Some nations have implemented new environmental regulations which set standards for the biodegradability of wellbore fluids (especially for off-shore drilling). Biodegradability is the process by which complex molecules are broken down by microorganisms to produce simpler compounds. However, as the molecular weight of a polymer increases, its biodegradability tends to decrease. Thus, in most of the cases, high molecular weight polymers may not satisfy the new environmental regulations, and, thus, the polymers may not be able to be used. As used herein, a high molecular weight polymer is a polymer that has an average molecular weight of greater than 10,000. As used herein, a low molecular weight polymer is a polymer that has an average molecular weight of less than 10,000.

Also, in general, as the molecular weight of a polymer increases, its solubility decreases. As a result, some high molecular weight polymers are generally water-swellable; whereas, some low molecular weight polymers are generally water soluble. As used herein, a polymer is "water soluble" if at least 1 part by weight of the polymer dissolves in 5 parts by weight of deionized water at a temperature of 80° F.

As used herein, a polymer is considered "biodegradable" if the polymer passes a ready biodegradability test or an inherent biodegradability test. It is preferred that a polymer is first tested for ready biodegradability and only if the polymer does not pass the ready biodegradability test then the polymer is then tested for inherent biodegradability. It is believed that the polymer according to the invention will pass the ready biodegradability or inherent biodegradability test.

In accordance with Organisation for Economic Co-operation and Development (OECD) guidelines, the following 6 tests permit the screening of chemicals for ready biodegradability. As used herein, a polymer showing more than 60% biodegradability in 28 days according to any one of the 6 ready biodegradability tests is considered a pass level for classifying it as "readily biodegradable," and it may be assumed that the polymer will undergo rapid and ultimate degradation in the environment. The 6 tests are: 301 A: DOC Die-Away; 301 B: CO2 Evolution (Modified Sturm Test); 301

C: MITI (I) (Ministry of International Trade and Industry, Japan); 301 D: Closed Bottle; 301 E: Modified OECD Screening; and 301 F: Manometric Respirometry.

1. For the 301A test, a measured volume of inoculated mineral medium, containing 10 mg to 40 mg dissolved organic carbon per liter (DOC/l) from the polymer as the nominal sole source of organic carbon, is aerated in the dark or diffuse light at 22±2° C. Degradation is followed by DOC analysis at frequent intervals over a 28-day period. The degree of biodegradation is calculated by expressing the concentration of DOC removed (corrected for that in the blank inoculum control) as a percentage of the concentration initially present. Primary biodegradation may also be calculated from supplemental chemical analysis for parent compound made at the beginning and end of incubation.

2. For the 301 B test, a measured volume of inoculated mineral medium, containing 10 mg to 20 mg DOC or total organic carbon per liter from the polymer as the nominal sole source of organic carbon is aerated by the passage of carbon dioxide-free air at a controlled rate in the dark or in diffuse light. Degradation is followed over 28 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation.

3. For the 301C test, the oxygen uptake by a stirred solution, or suspension, of the polymer in a mineral medium, inoculated with specially grown, unadapted micro-organisms, is measured automatically over a period of 28 days in a darkened, enclosed respirometer at 25+/−1° C. Evolved carbon dioxide is absorbed by soda lime. Biodegradation is expressed as the percentage oxygen uptake (corrected for blank uptake) of the theoretical uptake (ThOD). The percentage primary biodegradation is also calculated from supplemental specific chemical analysis made at the beginning and end of incubation, and optionally ultimate biodegradation by DOC analysis.

4. For the 301D test, a solution of the polymer in mineral medium, usually at 2-5 milligrams per liter (mg/l), is inoculated with a relatively small number of micro-organisms from a mixed population and kept in completely full, closed bottles in the dark at constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

5. For the 301E test, a measured volume of mineral medium containing 10 to 40 mg DOC/l of the polymer as the nominal sole source of organic carbon is inoculated with 0.5 ml effluent per liter of medium. The mixture is aerated in the dark or diffused light at 22+2° C. Degradation is followed by DOC analysis at frequent intervals over a 28 day period. The degree of biodegradation is calculated by expressing the concentration of DOC removed (corrected for that in the blank inoculums control) as a percentage of the concentration initially present. Primary biodegradation may also be calculated from supplemental chemical analysis for the parent compound made at the beginning and end of incubation.

6. For the 301F test, a measured volume of inoculated mineral medium, containing 100 mg of the polymer per liter giving at least 50 to 100 mg ThOD/l as the nominal sole source of organic carbon, is stirred in a closed flask at a constant temperature (+1° C. or closer) for up to 28 days. The consumption of oxygen is determined either by measuring the quantity of oxygen (produced electrolytically) required to maintain constant gas volume in the respirometer flask or from the change in volume or pressure (or a combination of the two) in the apparatus. Evolved carbon dioxide is absorbed in a solution of potassium hydroxide or another suitable absorbent. The amount of oxygen taken up by the microbial population during biodegradation of the test substance (corrected for uptake by blank inoculum, run in parallel) is expressed as a percentage of ThOD or, less satisfactorily, COD. Optionally, primary biodegradation may also be calculated from supplemental specific chemical analysis made at the beginning and end of incubation, and ultimate biodegradation by DOC analysis.

In accordance with OECD guidelines, the following three tests permit the screening of chemicals for inherent biodegradability. As used herein, a polymer with a biodegradation or biodegradation rate of >20% is regarded as "inherently primary biodegradable." A polymer with a biodegradation or biodegradation rate of >70% is regarded as "inherently ultimate biodegradable." A polymer passes the inherent biodegradability test if the polymer is either regarded as inherently primary biodegradable or inherently ultimate biodegradable when tested according to any one of the 3 tests. The 3 tests are: 302 A-1981 Modified SCAS Test; 302 B-1992 Zahn-Wellens Test; and 302 C-1981 Modified MITI Test. Inherent biodegradability refers to tests which allow prolonged exposure of the test compound to microorganisms, a more favorable test compound to biomass ratio, and chemical or other conditions which favor biodegradation.

1. For the 302A test, activated sludge from a sewage treatment plant is placed in an aeration (SCAS) unit. The polymer and settled domestic sewage are added, and the mixture is aerated for 23 hours. The aeration is then stopped, the sludge allowed to settle and the supernatant liquor is removed. The sludge remaining in the aeration chamber is then mixed with a further aliquot of the polymer and sewage and the cycle is repeated. Biodegradation is established by determination of the dissolved organic carbon content of the supernatant liquor. This value is compared with that found for the liquor obtained from a control tube dosed with settled sewage only.

2. For the 302B test, a mixture containing the polymer, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no polymer, is run in parallel. The biodegradation process is monitored by determination of DOC (or COD(2)) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

3. For the 302C test, an automated closed-system oxygen consumption measuring apparatus (BOD-meter) is used. The polymer to be tested is inoculated in the testing vessels with micro-organisms. During the test period, the biochemical oxygen demand is measured continuously by means of a BODmeter. Biodegradability is calculated on the basis of BOD and supplemental chemical analysis, such as measurement of the dissolved organic carbon concentration, concentration of residual chemicals, etc.

It has been discovered that a water-soluble, biodegradable polymer of acrylic acid, maleic acid, methacrylic acid, itaconic acid, fumeric acid, citraconic acid, mesoconic acid, and any combination thereof can be used as a set retarder. Another advantage is that the polymer can increase the thickening time by approximately 20% compared to conventional set retarders at the same concentration in the range of about 0.1% to about 5% by weight of cement and a temperature of 150° F. and a pressure of 5,160 psi. Yet another advantage to the polymer is it is salt tolerant. As used herein, "salt tolerant" means that a cement composition containing 325 g of deionized water, 860 g of Class-H Portland Cement, 0.4% bwc of the polymer, and sodium chloride (NaCl) at a concentration of 30% by weight of the water, at a constant temperature of 125° F. and a pressure of 5,160 psi, will have a thickening time of at least 2 hours. Thus, the polymer is water soluble, is biodegradable, is a set retarder, can be used in a lower concentration compared to conventional set retarders, can be used in the presence of salt, and is more cost effective compared to conventional set retarders.

According to an embodiment, a cement composition for use in a subterranean formation is provided. The cement composition comprises: (A) cement; (B) water; and (C) a polymer, wherein the polymer: (i) consists essentially of a monomer or monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing; (ii) has the following characteristics: (a) is water soluble; and (b) is biodegradable; and (iii) is capable of providing: (a) a thickening time of at least 2 hours for a test composition maintained under a temperature condition of 190° F. and a pressure of 5,160 psi; and (b) an initial setting time of less than 24 hours for the test composition maintained under a temperature condition of 217° F. and a pressure of 3,000 psi, wherein the test composition consists of 860 grams of Class-H Portland cement, 325 grams of deionized water, and 0.4% by weight of the cement of the polymer.

According to another embodiment, a method for cementing in a subterranean formation is provided. The method comprises the steps of: (A) introducing the cement composition into the subterranean formation; and (B) allowing the cement composition to set after introduction into the subterranean formation.

The cement composition includes cement. Preferably, the cement is Portland Cement Type I, II, or III. Preferably, the cement is Class A cement, Class C cement, Class G cement, or Class H cement. Preferably, the cement composition has a density in the range of about 9 to about 22 pounds per gallon (ppg).

The cement composition includes water. The water can be selected from the group consisting of freshwater, brackish water, and saltwater, in any combination thereof in any proportion. The cement composition also can include salt. Preferably, the salt is selected from sodium chloride, calcium chloride, calcium bromide, potassium chloride, potassium bromide, magnesium chloride, and any combination thereof in any proportion. Preferably, the salt is in a concentration in the range of about 0.1% to about 40% by weight of the water.

The cement composition includes a polymer, wherein the polymer consists essentially of a monomer or monomers selected from the group consisting of acrylic acid, esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing. The polymer can be grafted onto a biodegradable backbone such as gelatin, lignin, tannin, chitosan, and cellulose. If the polymer is grafted onto a biodegradable backbone, then, preferably, the backbone is gelatin. Preferably, the monomer or monomers are not AMPS or lignosulfonate and its salts. The polymer can also be an alkali metal, an alkaline earth metal, or an ammonium salt. The monomer or monomers can be neutralized prior to the polymerization reaction. The polymer can be neutralized or at least partially neutralized after the polymerization reaction. An alkali metal polymer means the product that results from a reaction of an acid with a Group I metal (which include lithium, sodium, potassium, rubidium, cesium, and francium). An example of an alkali metal polymer is acrylic acid sodium salt. An alkaline earth metal polymer means the product that results from a reaction of an acid with a Group IIA metal (which includes beryllium, magnesium, calcium, strontium, barium, and radium). An example of an alkaline earth metal polymer is calcium polyacrylate. An ammonium salt polymer means the product that results from a reaction of an acid and ammonia. An example of an ammonium salt polymer is ammonium polyacrylate.

Preferably, the esters of acrylic acid are selected from acrylate and butyl acrylate. Preferably, the ester of methacrylic acid is methacrylate.

If the polymer is a copolymer, then the monomers can be arranged as random, alternating, periodic, or block. Preferably, the monomers are arranged as random.

Preferably, for a homopolymer, the monomers are selected from acrylic acid, maleic anhydride, itaconic acid, and methacrylic acid. More preferably, for a homopolymer, the monomer is acrylic acid, and the homopolymer is a sodium salt. Preferably, for a copolymer, one of the monomers is acrylic acid, and the other monomer is selected from maleic anhydride, acrylamide, methacrylic acid, and butyl acrylate. More preferably, for a copolymer, the monomers are acrylic acid and maleic anhydride, and the copolymer is a sodium salt. Preferably, for a terpolymer, the monomers are: acrylic acid, maleic anhydride, and acrylamide; acrylic acid, methacrylic acid, and butyl acrylate; and acrylic acid, maleic anhydride, and itaconic acid. More preferably, for a terpolymer, the monomers are acrylic acid, maleic anhydride, and acrylamide, and the terpolymer is a sodium salt.

Preferably, the polymer is in at least a sufficient concentration such that the cement composition has a thickening time of at least 3 hours maintained under a temperature condition of 217° F. and a pressure of 10,200 psi. Preferably, the polymer is in a concentration equal to or less than a sufficient concentration such that the cement composition sets in less than 48 hours maintained under a temperature condition of 217° F. and a pressure of 3,000 psi. Preferably, the polymer is in a concentration in the range of about 0.05% to about 10% by weight of the cement. More preferably, the polymer is in a concentration in the range of about 0.1° A to about 2% by weight of the cement. One of skill in the art will be able to determine the concentration of the polymer needed in order to achieve the desired thickening time, for example, based on the amount of salt which may be present in the water and the bottom-hole temperature of the well, among other specific conditions of the well.

The polymer has an average molecular weight such that the polymer has the following characteristics: is water soluble and is biodegradable. Preferably, the polymer has an average chain length in the range of 5 to 80. More preferably, the polymer has an average chain length of 10 to 60. Preferably, the polymer has an average molecular weight in the range of about 500 to about 5,000. More preferably, the polymer has an average molecular weight in the range of about 600 to about 3,500. Most preferably, the polymer has an average molecular weight in the range of about 800 to about 2,000.

Preferably, for a copolymer with two monomers, the monomers are in a mole ratio of 50:50. More preferably, the monomers are in a mole ratio of 80:20. Most preferably, the monomers are in a mole ratio of 90:10. Preferably, for a terpolymer, the monomers are in a mole ratio of 40:30:30. More preferably, the monomers are in a mole ratio of 60:20:20. Preferably, one of the monomers is acrylic acid, and the acrylic acid is in the highest mole ratio compared to the other monomers. More preferably, the highest mole ratio monomer is acrylic acid, and the lowest mole ratio monomer from the above-listed group is maleic anhydride.

Preferably, the cement composition has a thickening time of at least 3 hours maintained under a temperature condition of 217° F. and a pressure of 10,200 psi. More preferably, the cement composition has a thickening time in the range of about 4 to about 10 hours maintained under a temperature condition of 217° F. and a pressure of 10,200 psi. Some of the variables that can affect the thickening time of the cement composition include the concentration of the polymer, the concentration of any salt present in the cement composition, and the bottomhole temperature of the well. Preferably, the cement composition sets in less than 48 hours maintained under a temperature condition of 217° F. and a pressure of 3,000 psi. More preferably, the cement composition sets in less than 24 hours maintained under a temperature condition of 217° F. and a pressure of 3,000 psi. Most preferably, the cement composition sets at a time in the range of about 8 to about 24 hours maintained under a temperature condition of 217° F. and a pressure of 3,000 psi.

Preferably, the cement composition has a compressive strength of at least 400 psi when tested at 24 hours and maintained under a temperature condition of 217° F. and a pressure of 3,000 psi. More preferably, the cement composition has a compressive strength in the range of 400 to 10,000 psi when tested at 24 hours and maintained under a temperature condition of 217° F. and a pressure of 3,000 psi.

The cement composition also can include at least one additional set retarder to help control the thickening time of the cement composition. Preferably, any additional set retarder is also biodegradable.

The cement composition can include other additives suitable for use in subterranean cementing operations. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, fluid loss control additives, defoaming agents, foaming agents, thixotropic additives, nano-particles, and combinations thereof. Preferably, any other additives are also biodegradable. For example, the cement composition can include a strength-retrogression additive. The strength-retrogression additive can be selected from the group consisting of course silica flour, fine silica flour, and any combination thereof in any proportion. Preferably, the strength stabilizer is in a concentration in the range of about 20% to about 50% by weight of the cement.

By way of another example, the cement composition can include a fluid loss additive. Suitable examples of fluid loss additives include HALAD®344, HALAD®413, HALAD®400, HALAD®9, HALAD®14, HALAD®23, HALAD®100A, HALAD®300, HALAD®350, HALAD®400L, HALAD®600, HALAD®600LE+, HALAD®613, HALAD®766, FDP-703, LATEX 2000, LAP-1, and LA-2, available from Halliburton Energy Services, Inc. Preferably, the fluid loss additive is in a concentration in the range of 0.1% to 4% by weight of the cement.

The fluid loss additive can be biodegradable. Examples of suitable biodegradable fluid loss additives include HALAD®400 and HALAD®300.

By way of another example, the cement composition can include a dispersant. Suitable examples of dispersants include CFRR2, CFR®3, CFR®SLE, CFR®6, CFR®8, FDP-701, and FDP-C-850, available from Halliburton Energy Services, Inc. Preferably, the dispersant is in a concentration in the range of 0.05% to 3% by weight of the cement.

The cement composition also can include a filler material. Suitable examples of filler materials include, but are not limited to, fly ash, sand, clays, and vitrified shale. Preferably, the filler material is in a concentration in the range of about 5% to about 50% by weight of the cement.

The cement composition also can include other additives. Commercially-available examples of other additives include, but are not limited to, SSA-1, SSA-2, HIGH DENSE 3, HIGH DENSE 4, Barite, MICROMAX, SILICALITE, HGS 6000, HGS-4000, HGS-10000, WELLLIFE 665, WELLLIFE 809, and WELLLIFE 810.

The method includes the step of introducing the cement composition into a subterranean formation. Preferably, the subterranean formation contains a well. Preferably, the portion of the well is a portion of the annulus. The step of introducing can be for the purpose of well completion, primary or remedial cementing operations, squeeze cementing, well-plugging, or gravel packing. The cement composition is in a pumpable state upon introduction into the subterranean formation. The method also includes the step of allowing the cement composition to set after introduction into the subterranean formation. The method can include the additional steps of perforating, fracturing, or performing an acidizing treatment, after the step of allowing the cement composition to set.

For the method, preferably, the cement composition has a thickening time of at least 3 hours at the bottomhole temperature and pressure of the well. More preferably, the cement composition has a thickening time in the range of about 4 to about 10 hours at the bottomhole temperature and pressure of the well. For example, one of skill in the art will be able to select the thickening time based on the specific conditions of the well (e.g., the length of the casing and the bottomhole temperature of the well). Some of the variables that can affect the thickening time of the cement composition include the concentration of the polymer, the concentration of any salt present in the cement composition, and the bottomhole temperature of the well. Preferably, the cement composition sets in less than 48 hours at the bottomhole temperature and pressure of the well. More preferably, the cement composition sets in less than 24 hours at the bottomhole temperature and pressure of the well. Most preferably, the cement composition sets at a time in the range of about 8 to about 24 hours at the bottomhole temperature and pressure of the well. Preferably, the cement composition is used in a well having a bottomhole temperature of at least 150° F. Preferably, the bottomhole temperature is in the range of 150° F. to 500° F. More preferably, the bottomhole temperature is in the range of about 180° F. to about 400° F. Most preferably, the bottomhole temperature is in the range of about 180° F. to about 350° F. Preferably, the cement composition develops a compressive strength of at least 1,500 psi after the cement composition has been introduced into the well and is situated in the portion of well to be cemented.

EXAMPLES

To facilitate a better understanding of the present invention, the following examples of certain aspects of preferred embodiments are given. The following examples are not the only examples that could be given according to the present invention and are not intended to limit the scope of the invention.

Tables 1.1, 2.1, and 2.2 show the effect of the concentration of a polymer and temperature on thickening time. For Tables 1.1, 2.1, and 2.2, several cement compositions, having a density of 16.4 pounds per gallon (ppg), were prepared. The cement compositions consisted of 5.48 gallons of deionized water; Class-H cement; SSA-2™ strength stabilizer at a concentration of 35% by weight of the cement (bwc); HALAD®344 fluid loss additive at a concentration of 0.5% bwc; and varying concentrations of a polymer according to the invention. Deionized water means water that has had its mineral ions removed, such as cations (e.g., sodium, calcium, iron, and copper) and anions (e.g., chloride and bromide). A polymer conventional set retarder, SCR100™ is listed in both tables. In Table 1.1, a copolymer according to the invention (PAA/MA) (having an average molecular weight of 4,500 and a mole ratio of 80:20) was used in varying concentrations. PAA/MA is a sodium salt copolymer of acrylic acid and maleic anhydride. In one instance in Table 1.1 the water contained salt, sodium chloride, in a concentration of 2.4% by weight of the water. In Tables 2.1 and 2.2, a homopolymer according to the invention (PAA) was used in varying concentrations. PAA is a homopolymer of acrylic acid. In Table 2.1, the PAA had an average molecular weight in the range of about 3,000 to about 4,000. In Table 2.2, the PAA had an average molecular weight of 1,200. All of the cement compositions were heated from an initial temperature of 70° F. to a maximum temperature of at least 190° F. over the course of 44 minutes and then maintained at that maximum temperature. The thickening time is the time it took for the cement compositions to reach 70 Bc maintained under a pressure condition of 10,200 psi. The consistency of the cement compositions were measured using a Fann Model 275 HTHP consistometer. The compressive strength of the cement compositions, maintained under a pressure condition of 3,000 psi, were measured at 24 or 48 hours after mixing using an Ultrasonic Cement Analyzer and expressed in units of pounds per square inch (psi). The initial setting time of the cement compositions was the time it took for the cement compositions to reach 50 psi, maintained under a pressure condition of 3,000 psi, using an Ultrasonic Cement Analyzer.

TABLE 1.1

| Set Retarder Used | Conc. of set retarder (% bwc) | Temperature (° F.) | Thickening Time (hours:mins) | Compressive Strength (psi) | Initial Setting Time (hours:mins) |
|---|---|---|---|---|---|
| 1 SCR-100 ™ | 0.4 | 217 | 4 to 6 hrs. | 2778 (24 hr) | 11:24 |
| 2 PAA/MA | 0.4 | 217 | 6:54 | 2592 (24 hr) | 12:32 |
| 3 PAA/MA | 0.2 | 217 | 2:35 | Not measured | Not measured |
| 4 PAA/MA | 0.4 | 245 | 3:13 | Not measured | Not measured |
| 5 PAA/MA | 0.4 | 300 | 1:06 | Not measured | Not measured |
| 6 PAA/MA (salt water) | 0.4 | 245 | 2:12 | Not measured | Not measured |
| 7 PAA/MA | 1.5 | 300 | 20.00+ | Not measured | Not measured |
| 8 PAA/MA | 0.7 | 300 | 3:01 | Not measured | Not measured |
| 9 PAA/MA | 0.8 | 300 | 4 hrs. | Not measured | Not measured |

As can be seen in Table 1.1, for a fixed concentration of PAA/MA, the thickening time decreases with an increase in temperature and concentration of salt. As can also be seen, PAA/MA performs comparably to the polymer conventional set retarder SCR100™. As can also be seen in Table 1.1, for a fixed temperature, the thickening time increases with an increase in concentration of PAA/MA.

TABLE 2.1

| Set Retarder Used | Conc. of set retarder (% bwc) | Temperature (° F.) | Thickening Time (hours:mins) | Compressive Strength (psi) | Initial Setting Time (hours:mins) |
|---|---|---|---|---|---|
| 1 SCR-100 ™ | 0.4 | 217 | 4 to 6 hrs. | 2778 | 11:24 |
| 2 PAA | 0.2 | 217 | 3:20 | Not measured | Not measured |
| 3 PAA | 0.3 | 217 | 5:56 | 1418 (24 hr) 2433 (48 hr) | 13:00 |
| 4 PAA | 0.4 | 217 | 8:27 | Not measured | Not measured |
| 5 PAA | 0.4 | 245 | 3:18 | Not measured | Not measured |
| 6 PAA | 0.4 | 300 | 1:14 | Not measured | Not measured |
| 7 PAA | 0.7 | 300 | 8:59 | Not measured | Not measured |
| 8 PAA | 1.0 | 350 | 12:26 | Not measured | Not measured |
| 9 PAA | 1.2 | 350 | 16:37 | Not measured | Not measured |

As can be seen in Table 2.1, for a fixed concentration of PAA, the thickening time decreases with an increase in temperature. As can also be seen, PAA performs comparably to the polymer conventional set retarder SCR-100™, even at lower concentrations. Also, as can be seen, at a fixed temperature, the thickening time increases as the concentration of PAA increases.

TABLE 2.2

| | Set Retarder Used | Conc. of set retarder (% bwc) | Temperature (° F.) | Thickening Time (hours:mins) | Compressive Strength (psi) | Initial Setting Time (hours:mins) |
|---|---|---|---|---|---|---|
| 1 | PAA | 0.2 | 217 | 3:49 | Not measured | Not measured |
| 2 | PAA | 0.4 | 190 | 12:22 | Not measured | Not measured |
| 3 | PAA | 0.4 | 217 | 9:30 | 461 (24 hrs) 2369 (48 hrs) | 21:19 |
| 4 | PAA | 0.4 | 245 | 4:24 | Not measured | Not measured |
| 5 | PAA | 0.6 | 245 | 5:38 | Not measured | Not measured |
| 6 | PAA | 1.0 | 245 | 11:44 | Not measured | Not measured |
| 7 | PAA | 1.2 | 270 | 3:13 | Not measured | Not measured |
| 8 | PAA | 1.2 | 300 | 1:56 | Not measured | Not measured |

As can be seen in Table 2.2, for a fixed concentration of PAA, the thickening time decreases with an increase in temperature. Also as can be seen, at a fixed temperature, the thickening time increases as the concentration of PAA increases.

Table 3.1 shows the fluid loss results for several cement compositions, having a density of 16.4 ppg, using two different fluid loss additives. The cement compositions consisted of the following: 5.48 gallons of deionized water; Class-H cement; SSA-2™ strength stabilizer at a concentration of 35% bwc; PAA as the polymer (having an average molecular weight in the range of about 3,000 to about 4,000) in varying concentrations; and two different fluid loss additives— HALAD®344 and HALAD®413 at varying concentrations. All of the cement compositions were heated from an initial temperature of 70° F. to a maximum temperature of 190° F. over the course of 44 minutes and then maintained at that maximum temperature and maintained at a constant pressure of 1,000 psi. The fluid loss through the cement compositions was measured by Static Fluid Loss Test Apparatus from FANN Instruments using API recommended procedure and is expressed in units of total milliliters (mL) lost.

TABLE 3.1

| | Conc. of PAA (% bwc) | Conc. of HALAD ®344 (% bwc) | Conc. of HALAD ®413 (% bwc) | Fluid loss (ml) |
|---|---|---|---|---|
| 1 | 0.3 | 0.5 | Not Present | 197 |
| 2 | 0.3 | 2 | Not Present | 74 |
| 3 | 0.3 | Not Present | 2 | 26 |
| 4 | 0.3 | 1 | 1 | 28 |
| 5 | 0.4 | 0.5 | 0.5 | 52 |
| 6 | 0.4 | Not Present | 1 | 92 |

As can be seen in Table 3.1, for a fixed concentration of PAA, the amount of fluid loss can be decreased by combining more than one fluid loss additive and also by varying the concentration of the fluid loss additives.

Figure 2:
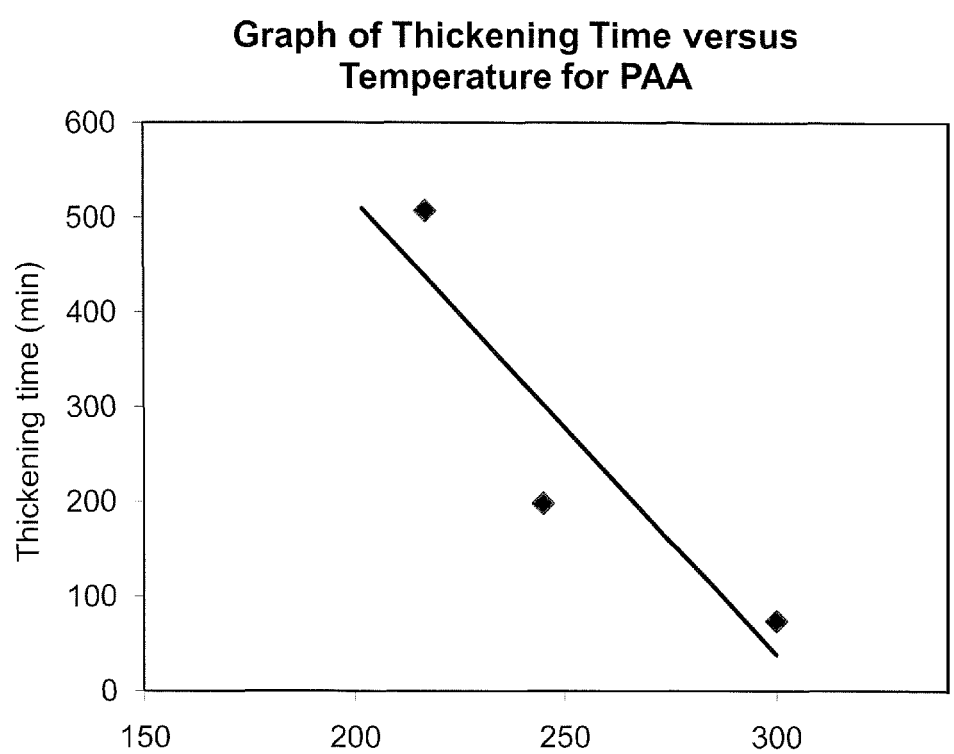
FIG. 2 is a graph of thickening time (min) versus temperature (° F.) for the cement composition at a pressure of 10,200 psi wherein the polymer was PAA (average molecular weight in the range of about 3,000 to about 4,000) at a concentration of 0.4% bwc.

The following Figures show the relationship between the concentration of PAA/MA or PAA and either temperature or salt concentration on the thickening time of a cement composition having a density of 16.4 ppg. The cement composition included: 5.48 gallons of deionized water; Class-H cement; SSA-2™ strength stabilizer at a concentration of 35% bwc; HALAD®344 fluid loss additive at a concentration of 0.5% bwc; and a polymer. FIG. 1 is a graph of thickening time in minutes (min) versus temperature in Fahrenheit (° F.) for the cement composition at a pressure of 10,200 psi wherein the polymer was PAA/MA (average molecular weight 4,500 and a mole ratio of 80:20) at a concentration of 0.4% bwc. FIG. 2 is a graph of thickening time (min) versus temperature (° F.) for the cement composition at a pressure of 10,200 psi wherein the polymer was PAA (average molecular weight in the range of about 3,000 to about 4,000) at a concentration of 0.4% bwc. The thickening time for FIGS. 1 and 2 was determined when the cement composition reached 70 Bc. As can be seen in FIGS. 1 and 2, the thickening time decreased with an increase in temperature.

Figure 3:
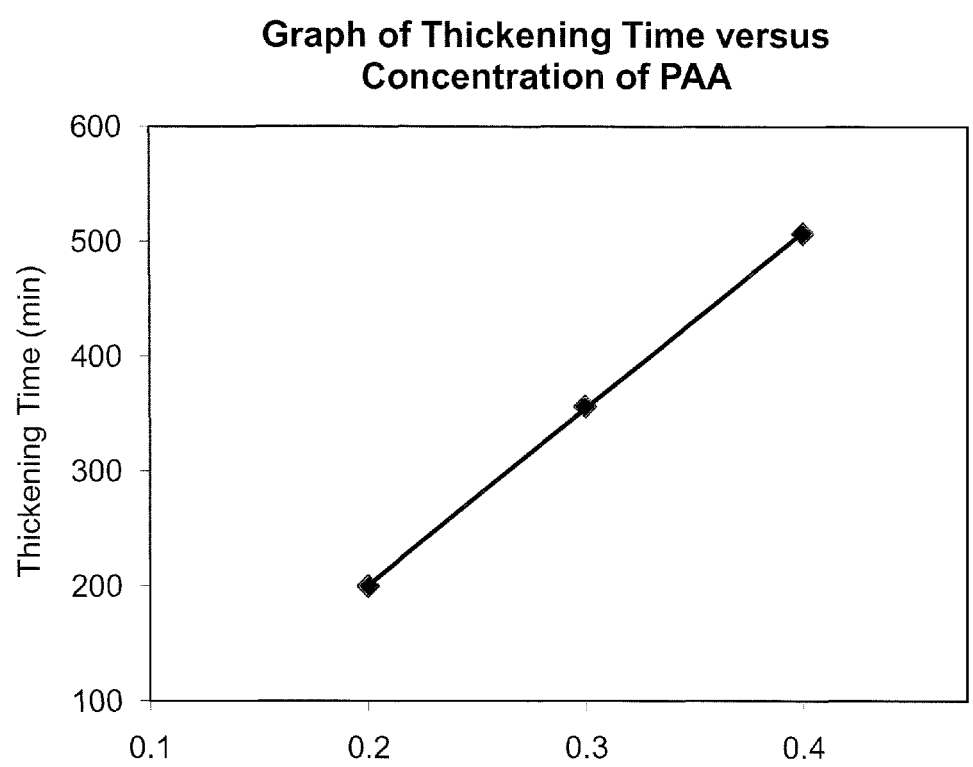
FIG. 3 is a graph of thickening time (min) versus concentration of the polymer PAA (% bwc) (average molecular weight in the range of about 3,000 to about 4,000) for the cement composition at a temperature of 217° F. and a pressure of 10,200 psi.

FIG. 3 is a graph of thickening time (min) versus concentration of PAA (% bwc) (average molecular weight in the range of about 3,000 to about 4,000) for the cement composition at a temperature of 217° F. and a pressure of 10,200 psi. The thickening time was determined when the cement composition reached 70 Bc. As can be seen in FIG. 3, the thickening time increased with an increase in the concentration of PAA.

Figure 4:
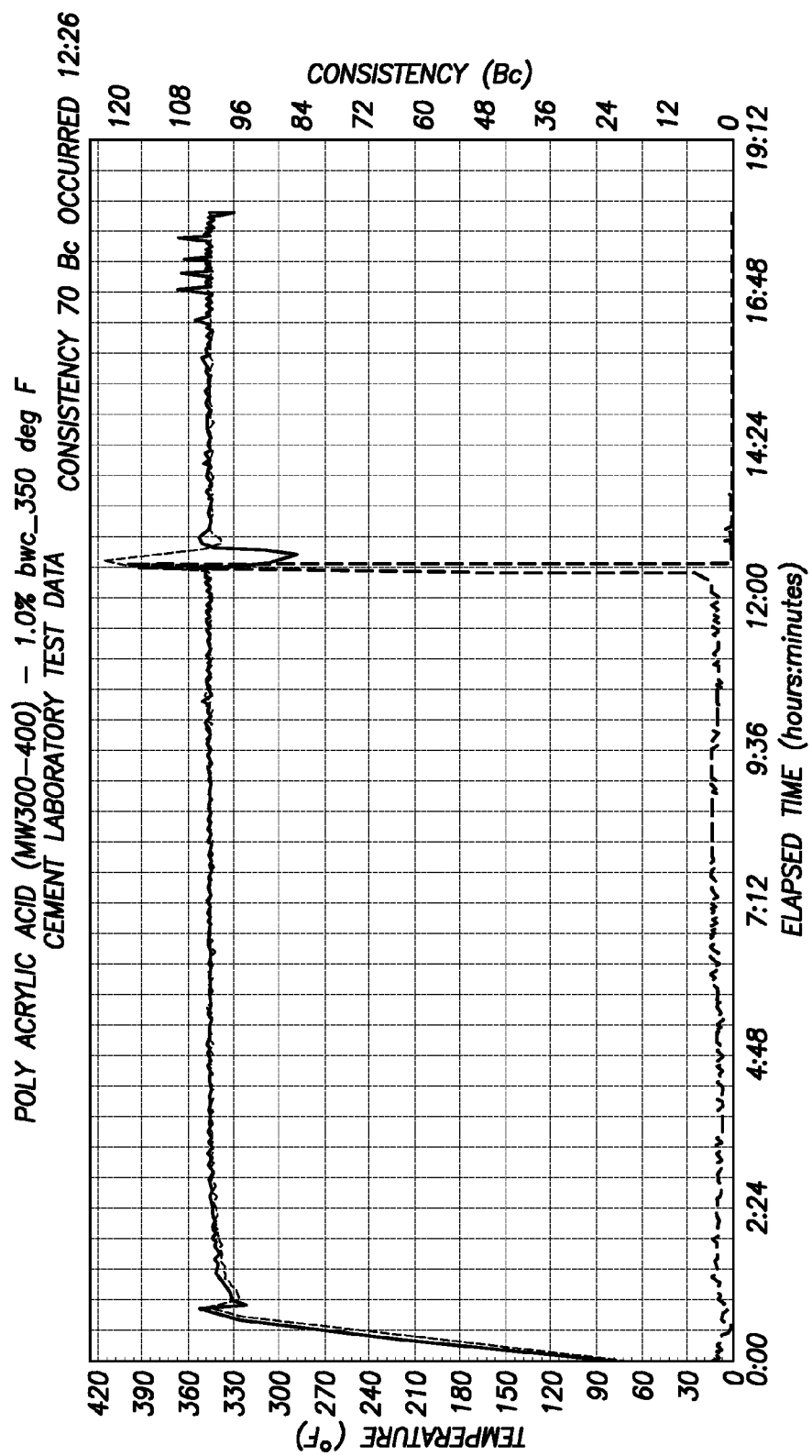
FIG. 4 is a graph of temperature (° F.) and consistency (Bc) versus time (hrs:min) for the cement composition heated to a temperature of 350° F. and a pressure of 10,200 psi wherein the polymer was PAA (average molecular weight in the range of about 3,000 to about 4,000) at a concentration of 1.0% bwc.

FIG. 4 is a graph of temperature (° F.) and consistency (Bc) versus time (hrs:min) for the cement composition at a temperature of 350° F. and a pressure of 10,200 psi wherein the polymer was PAA (average molecular weight in the range of about 3,000 to about 4,000) at a concentration of 1.0% bwc. As can be seen in FIG. 4, it took approximately 12 hours for the cement composition to reach at least 70 Bc at a temperature of 350° F.

Figure 5:
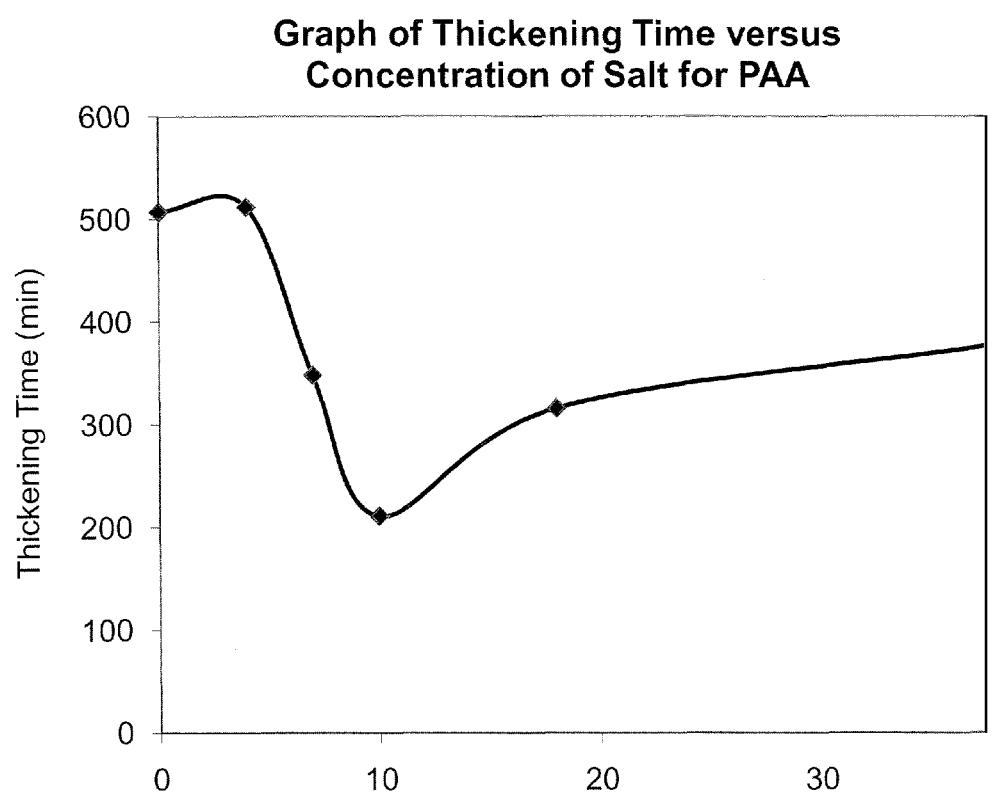
FIG. 5 is a graph of thickening time (min) versus concentration of sodium chloride (NaCl) (% by weight of water) for the cement composition at a temperature of 217° F. and a pressure of 10,200 psi wherein the polymer was PAA (average molecular weight in the range of about 3,000 to about 4,000) at a concentration of 0.4% bwc.

FIG. 5 is a graph of thickening time (min) versus concentration of sodium chloride (NaCl) measured as a percentage by weight of water for the cement composition at a temperature of 217° F. and a pressure of 10,200 psi wherein the polymer was PAA (average molecular weight in the range of about 3,000 to about 4,000) at a concentration of 0.4% bwc. As can be seen in FIG. 5, the concentration of salt affects the thickening time of the cement composition. Initially, as the concentration of salt increases, the thickening time decreases. However, as the concentration of salt continues to increase, a saturation curve can be observed.

Figure 6:
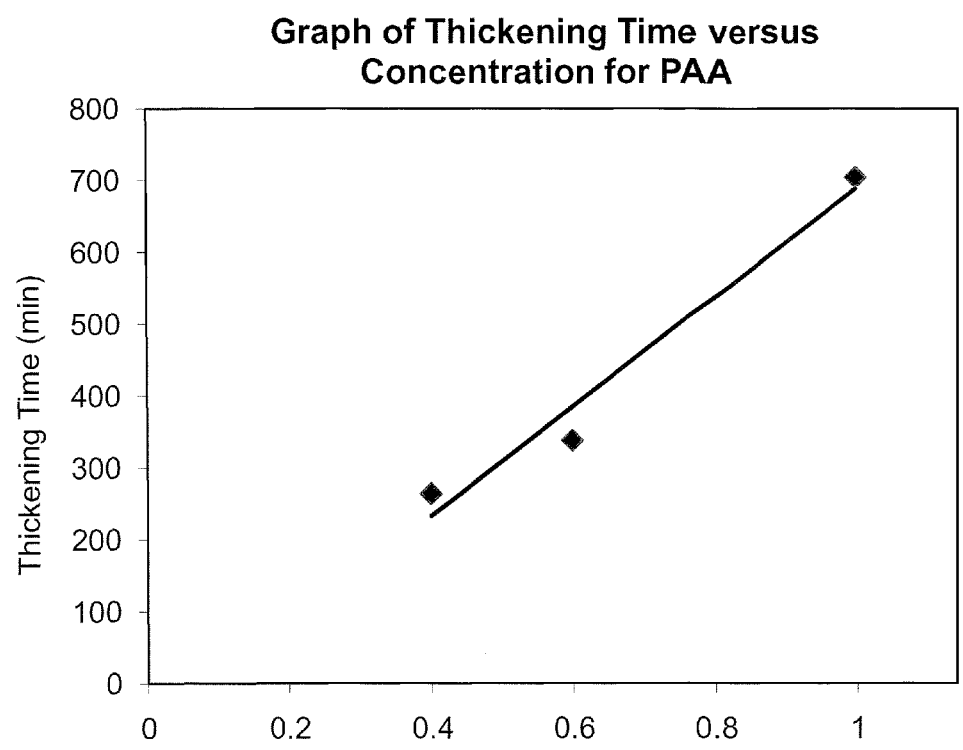
FIG. 6 is a graph of thickening time (min) versus concentration of PAA (% bwc) (average molecular weight of 1,200) for the cement composition at a temperature of 245° F. and a pressure of 10,200 psi.

FIG. 6 is a graph of thickening time (min) versus concentration of FAA (% bwc) (average molecular weight of 1,200) for the cement composition at a temperature of 245° F. and a pressure of 10,200 psi. The thickening time was determined when the cement composition reached 70 Bc. As can be seen in FIG. 6, the thickening time increased with an increase in the concentration of PAA.

Figure 7:
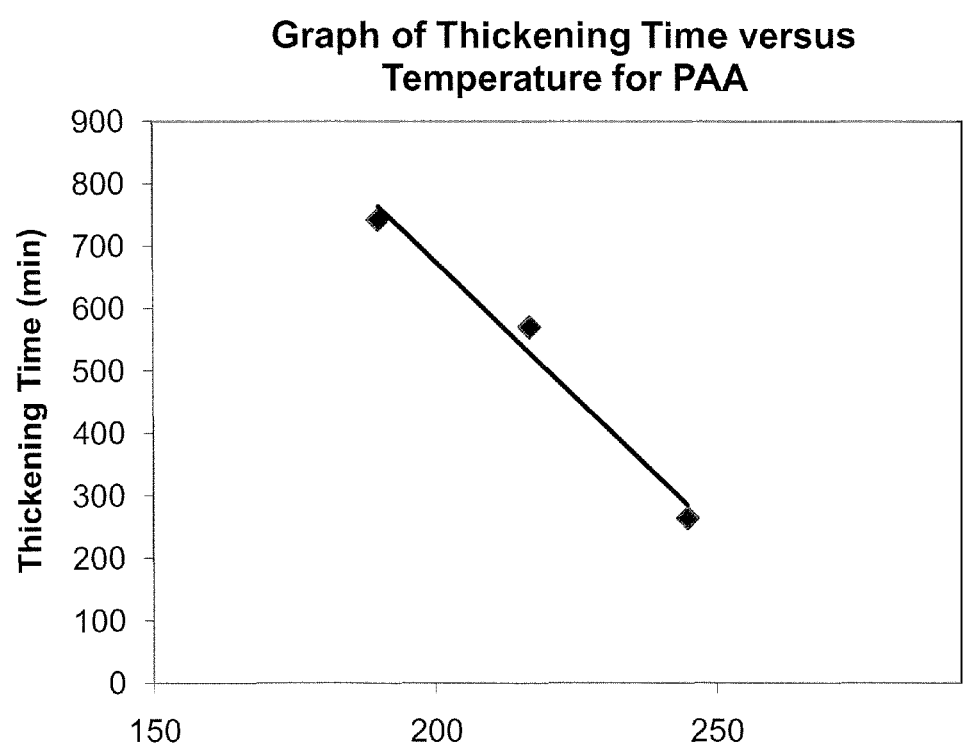
FIG. 7 is a graph of thickening time (min) versus temperature (° F.) for the cement composition at a pressure of 10,200 psi wherein the polymer was the homopolymer PAA (average molecular weight of 1,200) at a concentration of 0.4% bwc.

FIG. 7 is a graph of thickening time (min) versus temperature (° F.) for the cement composition at a pressure of 10,200 psi wherein the polymer was the homopolymer PAA (average molecular weight of 1,200) at a concentration of 0.4% bwc. The thickening time was determined when the cement composition reached 70 Bc. As can be seen in FIG. 7, the thickening time decreased with an increase in temperature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method for cementing in a subterranean formation, the method comprising the steps of:
   (A) introducing a cement composition into the subterranean formation, the composition comprising:
      (i) cement;
      (ii) water; and
      (iii) a polymer, wherein the polymer:
         (a) consists essentially of a monomer or monomers selected from the group consisting of esters of acrylic acid, maleic acid, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing, wherein the monomer or monomers are not grafted to a polymer backbone;
         (b) has the following characteristics:
            (I) is water soluble; and
            (II) is biodegradable; and
         (c) is capable of providing:
            (I) a thickening time of at least 2 hours for a test composition maintained under a temperature condition of 190° F. and a pressure of 5,160 psi; and
            (II) an initial setting time of less than 24 hours for the test composition maintained under a temperature condition of 217° F. and a pressure of 3,000 psi;
         wherein the test composition consists of 860 grams of Class-H Portland cement, 325 grams of deionized water, and 0.4% by weight of the cement of the polymer; and
   (B) allowing the cement composition to set after introduction into the subterranean formation.

2. The method according to claim 1, wherein the cement is selected from the group consisting of: Class A cement, Class C cement, Class G cement, or Class H cement.

3. The method according to claim 1, wherein the water is selected from the group consisting of freshwater, brackish water, saltwater, and brine, in any combination thereof in any proportion.

4. The method according to claim 1, wherein the cement composition has a density in the range of about 9 to about 22 pounds per gallon (ppg).

5. The method according to claim 1, wherein the polymer is a homopolymer, and the monomer is selected from the group consisting of: maleic anhydride, itaconic acid, or methacrylic acid.

6. The method according to claim 1, wherein the polymer is in at least a sufficient concentration such that the cement composition has a thickening time of at least 3 hours maintained under a temperature condition of 217° F. and a pressure of 10,200 psi.

7. The method according to claim 1, wherein the polymer is in a concentration equal to or less than a sufficient concentration such that the cement composition sets in less than 48 hours maintained under a temperature condition of 217° F. and a pressure of 3,000 psi.

8. The method according to claim 1, wherein the polymer is in a concentration in the range of about 0.05% to about 10% by weight of the cement.

9. The method according to claim 1, wherein the polymer is in a concentration in the range of about 0.1% to about 2% by weight of the cement.

10. The method according to claim 1, wherein the polymer has an average molecular weight in the range of about 500 to about 5,000.

11. The method according to claim 1, wherein the polymer has an average molecular weight in the range of about 600 to about 3,500.

12. The method according to claim 1, wherein the polymer has an average molecular weight in the range of about 800 to about 2,000.

13. The method according to claim 1, wherein the cement composition has a thickening time of at least 3 hours maintained under a temperature condition of 217° F. and a pressure of 10,200 psi.

14. The method according to claim 1, wherein the cement composition has a thickening time in the range of 4 to 10 hours maintained under a temperature condition of 217° F. and a pressure of 10,200 psi.

15. The method according to claim 1, wherein the cement composition has a compressive strength of at least 400 psi when tested at 24 hours and maintained under a temperature condition of 217° F. and a pressure of 3,000 psi.

16. The method according to claim 1, wherein the cement composition has a compressive strength in the range of 400 to 10,000 psi when tested at 24 hours and maintained under a temperature condition of 217° F. and a pressure of 3,000 psi.

17. The method according to claim 1, wherein the subterranean formation contains a well.

18. The method according to claim 17, wherein at least a portion of the well has a bottomhole temperature in the range of 150° F. to 400° F.

19. A method for cementing in a subterranean formation, the method comprising the steps of:
   (A) introducing a cement composition into the subterranean formation, the composition comprising:
      (i) cement;
      (ii) water; and
      (iii) a polymer, wherein the polymer:
         (a) consists essentially of:
            (I) monomer or monomers selected from the group consisting of: of acrylic acid and any alkali metal, alkaline earth metal, or ammonium salt of any of the foregoing, and (II) monomer or monomers selected from the group consisting of esters of acrylic acid, butyl acrylate, maleic acid, maleic anhydride, acrylamide, methacrylic acid, esters of methacrylic acid, itaconic acid, fumeric acid, citraconic acid, mesoconic acid, and any alkali metal, alkaline earth metal, or ammonium salt of any of the foregoing, and any combination of any of the foregoing, wherein the monomer or monomers are not grafted to a polymer backbone;

(b) has the following characteristics:
(I) is water soluble; and
(II) is biodegradable; and (c) is capable of providing:
(I) a thickening time of at least 2 hours for a test composition maintained under a temperature condition of 190° F. and a pressure of 5,160 psi; and
(II) an initial setting time of less than 24 hours for the test composition maintained under a temperature condition of 217° F. and a pressure of 3,000 psi;
wherein the test composition consists of 860 grams of Class-H Portland cement, 325 grams of deionized water, and 0.4% by weight of the cement of the polymer; and (B) allowing the cement composition to set after introduction into the subterranean formation.

20. A method for cementing in a subterranean formation, the method comprising the steps of:

(A) introducing a cement composition into the subterranean formation, the composition comprising:
(i) cement;
(ii) water; and
(iii) a polymer, wherein the polymer:
(a) consists essentially of a monomer or monomers selected from the group consisting of esters of acrylic acid, esters of methacrylic acid, fumeric acid, and any alkali metal, alkaline earth metal, or ammonium salt of any of the foregoing, and any combination of any of the foregoing, wherein the monomer or monomers are not grafted to a polymer backbone;
(b) has the following characteristics:
(I) is water soluble; and
(II) is biodegradable; and
(c) is capable of providing:
(I) a thickening time of at least 2 hours for a test composition maintained under a temperature condition of 190° F. and a pressure of 5,160 psi; and
(II) an initial setting time of less than 24 hours for the test composition maintained under a temperature condition of 217° F. and a pressure of 3,000 psi;
wherein the test composition consists of 860 grams of Class-H Portland cement, 325 grams of deionized water, and 0.4% by weight of the cement of the polymer; and (B) allowing the cement composition to set after introduction into the subterranean formation.

* * * * *